US012532106B2

(12) United States Patent
Yuan

(10) Patent No.: US 12,532,106 B2
(45) Date of Patent: Jan. 20, 2026

(54) AUDIO EQUIPMENT WITH A SOUND SIGNAL AMPLIFICATION STRUCTURE

(71) Applicant: ENCORE USA, INC., La Puente, CA (US)

(72) Inventor: Changlong Yuan, Shenzhen (CN)

( * ) Notice: Subject to any disclaimer, the term of this patent is extended or adjusted under 35 U.S.C. 154(b) by 247 days.

(21) Appl. No.: 18/520,808

(22) Filed: Nov. 28, 2023

(65) Prior Publication Data

US 2025/0063290 A1 Feb. 20, 2025

(30) Foreign Application Priority Data

Aug. 15, 2023 (CN) ........................ 202322193933.4

(51) Int. Cl.
*H04R 1/22* (2006.01)

(52) U.S. Cl.
CPC ..................................... *H04R 1/22* (2013.01)

(58) Field of Classification Search
CPC ............... H04R 1/22; H04R 1/34; H04R 1/28
USPC .................. 381/104, 87, 332, 336, 160, 161
See application file for complete search history.

(56) References Cited

U.S. PATENT DOCUMENTS

2005/0058300 A1* 3/2005 Suzuki .................. H04R 27/00 381/91
2018/0242061 A1* 8/2018 Honda ..................... H04R 3/04

* cited by examiner

*Primary Examiner* — Vivian C Chin
*Assistant Examiner* — Douglas J Suthers
(74) *Attorney, Agent, or Firm* — Sam Pierce

(57) ABSTRACT

The present disclosure relates an acoustic signal output equipment, and in particular to an audio equipment. The audio equipment comprises a sound emit device, the sound emit device is used to emit sound signals, the audio equipment also comprises a sound signals amplification structure and a connection structure. The sound signals amplification structure has an axis and a sound signals amplification surface, the sound signals amplification surface is formed by rotating the axis, the sound signals amplification surface faces the sound emit device directly, with a distance between the sound signals amplification surface and the sound emit device, in a direction of away from the sound emit device, a cross sectional area of the sound signals amplification surface is increased gradually.

14 Claims, 11 Drawing Sheets

AUDIO EQUIPMENT WITH A SOUND SIGNAL AMPLIFICATION STRUCTURE

FIELD OF THE DISCLOSURE

The present disclosure relates to a field of acoustic signal output equipment, and in particular to an audio equipment.

BACKGROUND OF THE DISCLOSURE

The frequency range of sound that can be heard by human ear is 20 Hz to 20000 Hz, divide the audible sound into three frequency bands according to the frequency doubling, and determine the low frequency band, medium frequency band, and high frequency band, that is, the range of low frequency band is 20 Hz to 160 Hz (3 frequency doubling), the range of medium frequency band s 20 Hz to 160 Hz (4 frequency doubling), the range of high frequency band is 160 Hz to 2500 Hz (3 frequency doubling), According to the acoustic principle, at low frequency band, the wavelength of the sound wave radiated by the horn unit is greater than the side length of the diaphragm of the horn unit, the sound radiation has no obvious directionality, but as the frequency increases, when the wavelength of the sound wave radiated by the horn unit is equal to or less than the side length of the diaphragm of the horn unit, the sound radiation will generate a focusing phenomenon along the direction of the reference axis, resulting in a clear directionality of the radiated sound pressure, that is, there will be uneven sound within the range of sound propagation, which seriously affects the subjective listening experience of users.

SUMMARY OF THE DISCLOSURE

The present disclosure relates to a audio equipment, aims to make the high-frequency energy around the audio equipment is basically the same, in order to improve the user's listening experience.

To solve the above technical problems, the purpose of this disclosure is to make the high frequency energy around the audio equipment evenly through the following technical solutions:

an audio equipment, comprises a sound emit device, the sound emit device is used to emit sound signals, wherein the audio equipment also comprises a sound signals amplification structure and a connection structure. The sound signals amplification structure has an axis and a sound signals amplification surface, the sound signals amplification surface is formed by rotating the axis, the sound signals amplification surface faces the sound emit device directly, with a distance between the sound signals amplification surface and the sound emit device, in a direction of away from the sound emit device, a cross sectional area of the sound signals amplification surface increases gradually. The connection structure connects the sound emit device and the sound signals amplification structure.

For the audio equipment, the sound signals emit from the sound emit device transmit along the sound signals amplification surface, as the cross sectional area of the sound signals amplification surface increases gradually, the sound signals spreads evenly along the signal amplification surface towards all directions, in the horizontal direction, the sound signals will transmit 360° around the axis. Thus, the high-frequency energy around the audio equipment is basically the same, improving the user's listening experience. It should be noted that the directionality of high frequency band is more remarkable than that of low frequency band and medium frequency band, when the high frequency energy around the audio equipment is basically the same, the energy of low frequency and medium frequency can also be is basically the same.

Furthermore, the sound signals amplification structure comprises:

an arc-shaped body, the arc-shaped body connects with the connection structure;

a cone-shaped body, the cone-shaped body faces the sound emit device directly, the cone-shaped body connects with the arc-shaped body on the side of near the sound emit device, the arc-shaped body and the cone-shaped body are arranged around a same axis, in a direction of away from the sound emit device, cross sectional areas of the arc-shaped body and the cone-shaped body are increased gradually, outer surfaces of the cone-shaped body and the arc-shaped body formed the sound signals amplification surface.

Furthermore, the cone-shaped body comprises:

a first cone part, the first cone part faces the sound emit device directly;

a second cone part, the second cone part is placed coaxially with the first cone part, and connects with the first cone part on a side of away from the sound emit device;

a third cone part, the third cone part is placed coaxially with the first cone part, and connects with the second cone part on a side of away from the sound emit device, inclinations of the first cone part, the second cone part and the third cone part are gradually decreased.

Furthermore, the sound signals amplification surface is aspherical.

Furthermore, a range of the distance between the sound signals amplification surface and the sound emit device is 6 mm-25 mm.

Furthermore, the sound emit device comprises:

a shell, the shell connects with the connection structure, an end of the shell which is near the sound signals amplification structure formed an arc-shaped part;

first sound emit units, the first sound emit units connect with the arc-shaped part, and locate on a center of the arc-shaped part, the first sound emit units face the sound signals amplification surface directly.

Furthermore, a concave area is formed on a center of the arc-shaped part, the first sound emit units are located on the concave area, the first sound emit units and the concave area are coaxial setting.

Furthermore, a distance between the first sound emit units and the sound signals amplification structure is smaller than a distance between the arc-shaped part and the sound signals amplification structure.

Furthermore, an amount of the first sound emit units is multiple, multiple of the first sound emit units are set around the axis.

Furthermore, the sound emit device comprises:

a second sound emit unit, the second sound emit unit connects with the shell, an orientation of the second sound emit unit is perpendicular to a orientation of the first sound emit units;

a third sound emit unit, the third sound emit unit connects with the shell, the third sound emit unit and the second sound emit unit are set back to back, the third sound emit unit and the second sound emit unit locate on the opposite sides of the shell;

a forth sound emit unit, the forth sound emit unit connects with the shell, the forth sound emit unit and the first sound emit units are set back to back, the forth sound emit unit and the first sound emit units locate on the opposite sides of the shell.

Furthermore, the first sound emit units are tweeters, the second sound emit unit and the third sound emit unit are medium and low frequency speaker, the forth sound emit unit is a woofer.

Furthermore, the connection structure comprises four connecting arms, four of the connecting arms are set separately around the axis of the sound signals amplification structure, each of the connecting arms connect with the sound signals amplification structure and the sound emit device, four of the connecting arms locate on the outside of the sound emit device.

Furthermore, the connection structure also comprises:

a base, the sound emit device is set on the base;

a top, the top and the base are set relative to each other, the sound signals amplification structure connects with the top, ends of the connecting arms are connect with the base, other ends of the connecting arms are connect with the top.

Furthermore, an upper end of the top forms a grip.

Furthermore, an accommodation space is formed between the top, the base and two adjacent connecting arms.

Furthermore, the connection structure comprises a connecting arm, the connecting arm connects with the sound signals amplification structure and the sound emit device, the connecting arm has an obstruction surface, an obstruction space forms by links between two sides of the obstruction surface and the axis of the sound signals amplification structure, a central angle of the obstruction space is 90°

Furthermore, the obstruction surface is a curved surface.

The present disclosure provides an audio equipment, with the use of sound signals amplification structure the sound signals spreads evenly towards all directions, make the high-frequency energy around the audio equipment is basically the same, improving the user's listening experience. By setting the connection structure to keep the position of signal amplification structure and sound emit device stable.

BRIEF DESCRIPTION OF THE DRAWINGS

To illustrate the technical solution according to the embodiments of the present disclosure or in the prior art more clearly, the accompanying drawings for describing the embodiments or the prior art are introduced briefly in the following. Apparently, the accompanying drawings in the following description are only about some embodiments of the present disclosure, and those of ordinary skill in the art can derive other drawings from the accompanying drawings without creative efforts.

100 audio equipment;

10 sound emit device; 11 shell; 111 arc-shaped part; 112 concave area; 12 first sound emit units; 13 second sound emit unit; 14 third sound emit unit; 15 forth sound emit unit;

20 sound signals amplification structure; 21 cone-shaped body; 211 first cone part; 212 second cone part; 213 third cone part; 22 arc-shaped body; 23 supporting arm;

30 connection structure; 31 connecting arm; 32 base; 33 top; 331 grip; 34 accommodation space;

O axis; H distance; S sound signals amplification surface; L links; A obstruction space.

DETAILED DESCRIPTION OF THE EMBODIMENTS

Technical solutions of the present disclosure are further described in detail with reference to the accompanying drawings and embodiments. It is to be understood that the specific embodiments described herein are merely used for describing the present disclosure, but are not intended to limit the present disclosure. Based on embodiments in the present disclosure, all other embodiments obtained by those of ordinary skill in the art without making creative work are within the scope of the present disclosure.

It should be understood that when used in this specification and the claims, the terms "comprise" and "including" indicate the presence of the described features, whole, step, operation, element, and/or component, but do not refers to exclude the presence one or more other features, whole, step, operation, element, component, and/or set thereof.

It should also be understood that the terms used in this specification are only for the purpose of describing specific embodiments and are not intended to limit present disclosure. As used in the specification and the claims of the present disclosure, unless the clearly indicates other circumstances, the singular forms of "a", "an", and "the" are intended to include the plural forms.

It should also be further understood that the term "and/or" used in the specification and the claims refers to any combination and all possible combinations of one or more of the related listed items, and includes these combinations.

It should be noted that in the present disclosure, when using "-" to represent range, the endpoint values should be included, such as 1-10, which should be understood as greater than or equal to 1 and less than or equal to 10.

Figure 1:
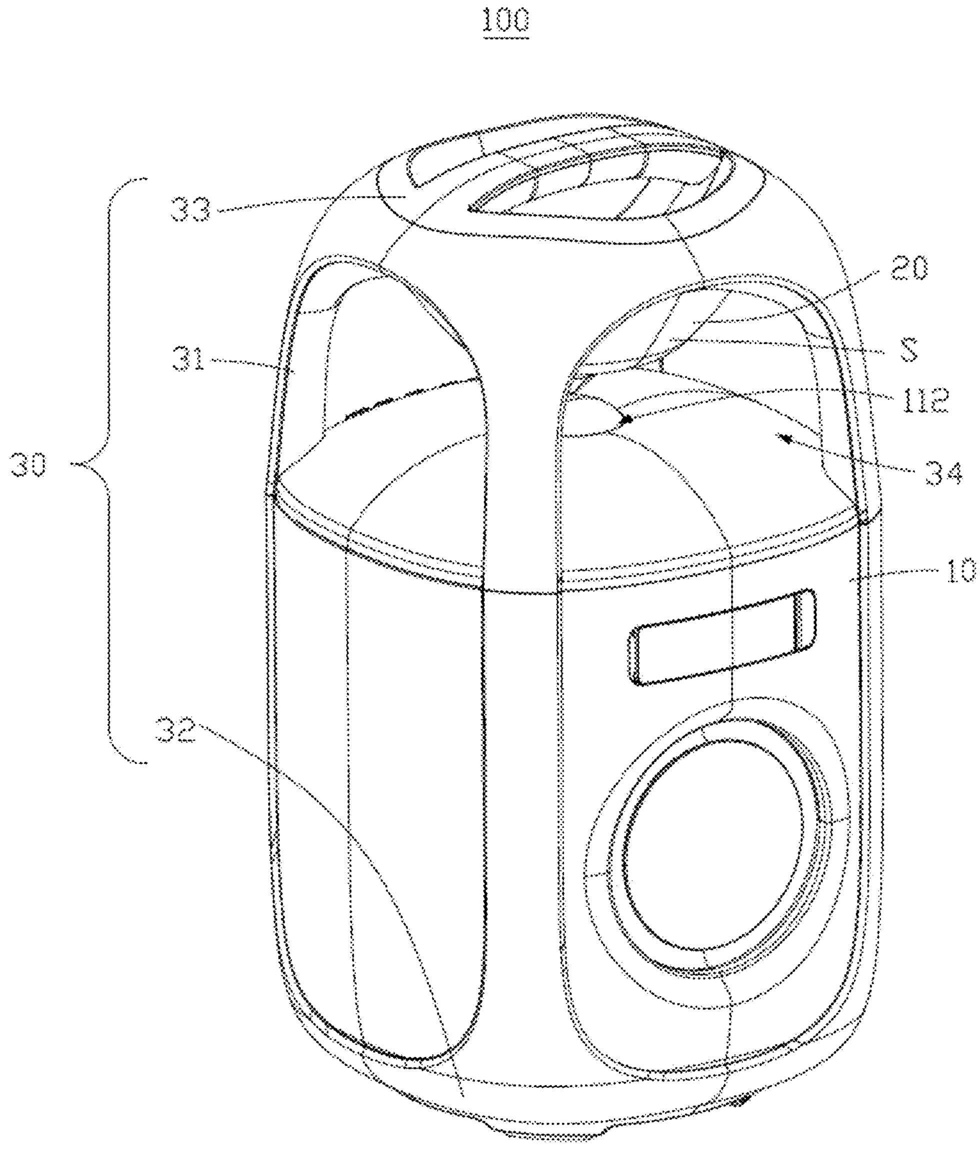
FIG. 1 is a three-dimensional structural schematic diagram of an embodiment of the audio equipment of the present disclosure.
Figure 2:
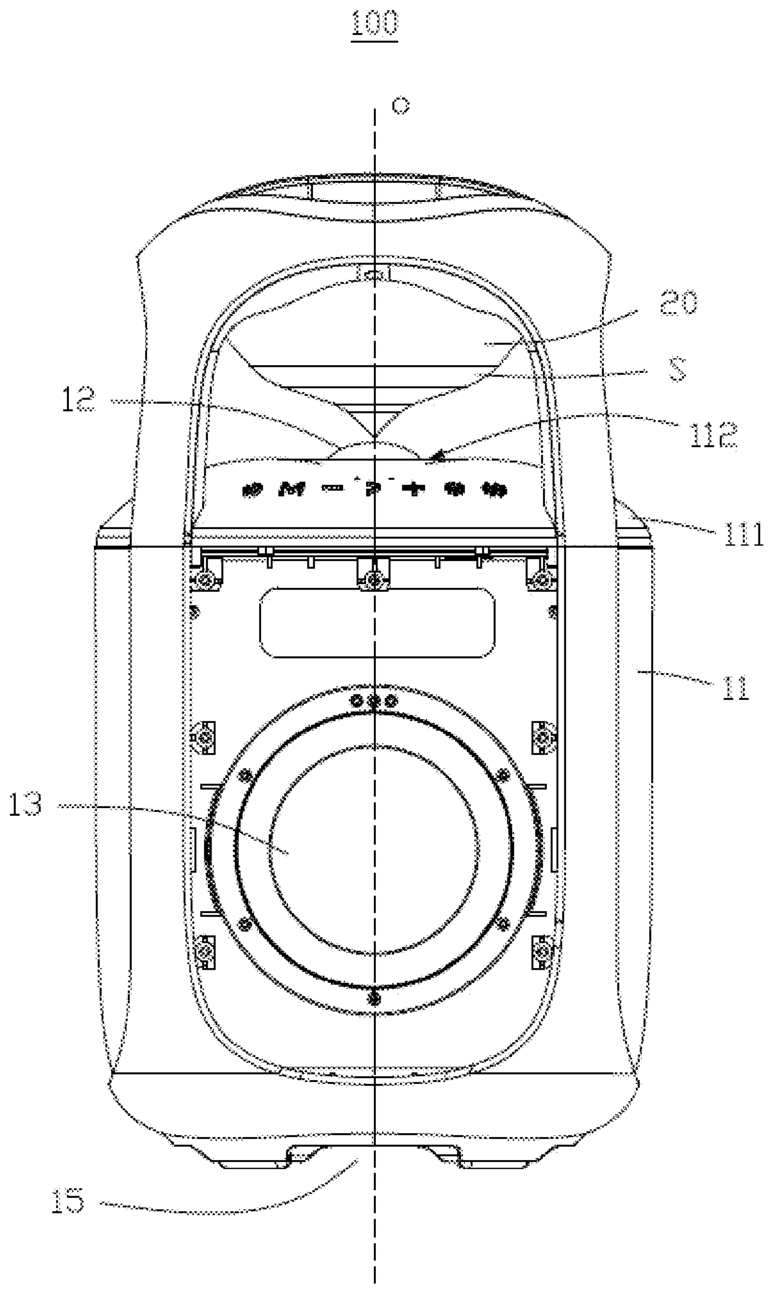
FIG. 2 is a side view of the audio equipment shown in FIG. 1.

With reference to FIG. 1 and FIG. 2, the present disclosure provides an audio equipment 100, comprises a sound emit device 10, a sound signals amplification structure 20 and a connection structure 30, the connection structure 30 connects the sound emit device 10 and the sound signals amplification structure 20. The sound emit device 10 is used to emit sound signals, the sound signals amplification structure 20 faces the sound emit device 10 directly, the sound signals amplification structure 20 is used to emit sound signals, which can reduce the directionality of sound signals, make the high-frequency energy around the audio equipment 100 is basically the same, improving the user's listening experience.

The sound signals amplification structure 20 has an axis O and a sound signals amplification surface S, the sound signals amplification surface S is formed by rotating the axis O, the sound signals amplification surface S faces the sound emit device 10 directly, with a distance H between the sound signals amplification surface S and the sound emit device 10, in a direction of away from the sound emit device 10, a cross sectional area of the sound signals amplification surface S increases gradually.

The sound signals emit from the sound emit device 10 deliver to the sound signals amplification surface S, as the cross-sectional area of the sound signals amplification surface S increased gradually, leading the sound signals spread evenly along the signal amplification surface S towards all directions, in the horizontal direction, the sound signals will transmit 360° around the axis O. Thus, the high-frequency energy around the audio equipment is basically the same, improving the user's listening experience. It should be note that the directionality of high frequency band is greater than the directionality of low frequency band and the directionality of medium frequency band, when the high frequency energy is basically the same, the energy of low frequency and the energy of medium frequency will be is basically the same, too.

Figure 3:
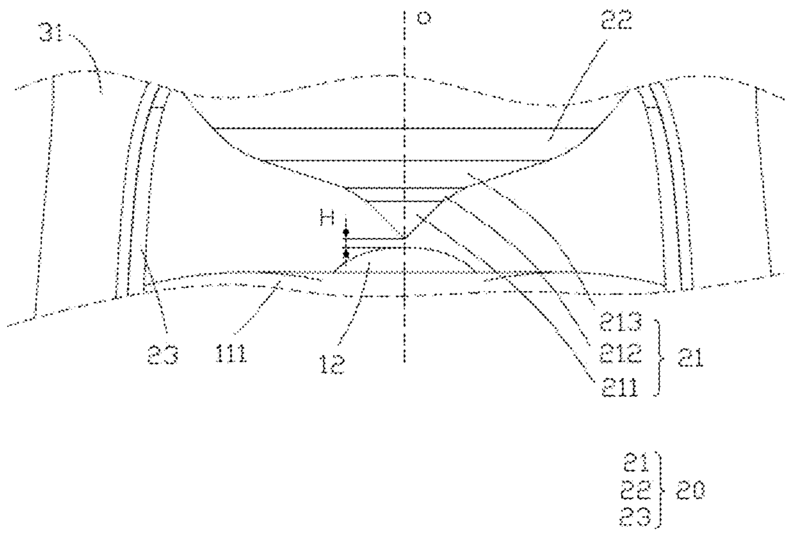
FIG. 3 is a side view of a part of the audio equipment shown in FIG. 2.

With reference to FIG. 3, in some embodiments, a range of the distance H between the sound signals amplification surface S and the sound emit device 10 is 6 mm-25 mm. When the distance H between the sound signals amplification surface S and the sound emit device is too small, the sound signals amplification surface S can easily block the sound signals emit from the sound emit device 10, resulting influence the sound signals transmit to users. When the distance H is too much, the transmission effect of sound signals of the sound signals amplification surface S is weakened, it is prone to the situation of uneven of the high frequency energy around the audio equipment 100. Furthermore, the range of the distance H between the sound signals amplification surface S and the sound emit device 10 is 10 mm, 12 mm, 14 mm, 16 mm, 18 mm or 20 mm. It should be note that the range of the distance H between the sound signals amplification surface S and the sound emit device 10 is on the vertical direction, the distance between an end of the sound signals amplification surface S which is closest to the sound emit device 10 an end of the sound emit device 10 which is closest to the sound signals amplification surface S.

Figure 4:
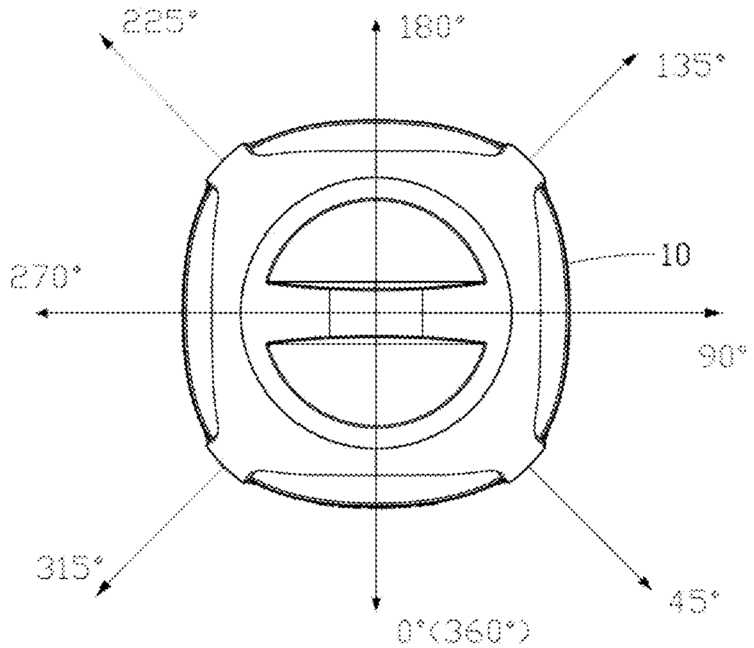
FIG. 4 is a top view of the audio equipment shown in FIG. 1.
Figure 5:
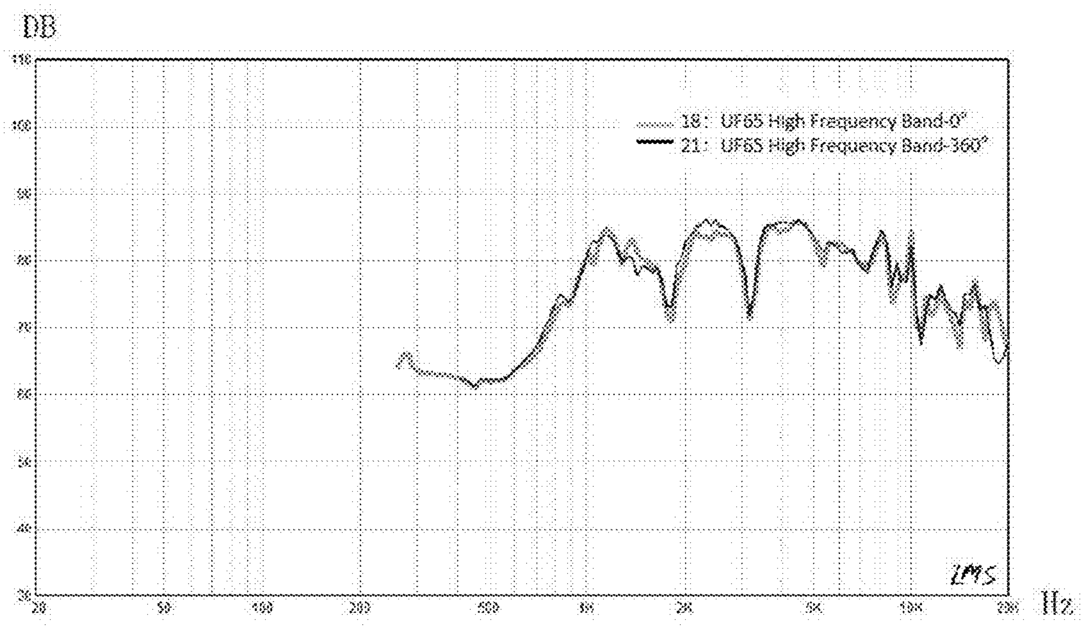
FIG. 5 to FIG. 7 are result graphs of high frequency band test of different angles of the audio equipment shown in FIG. 1.
Figure 6:
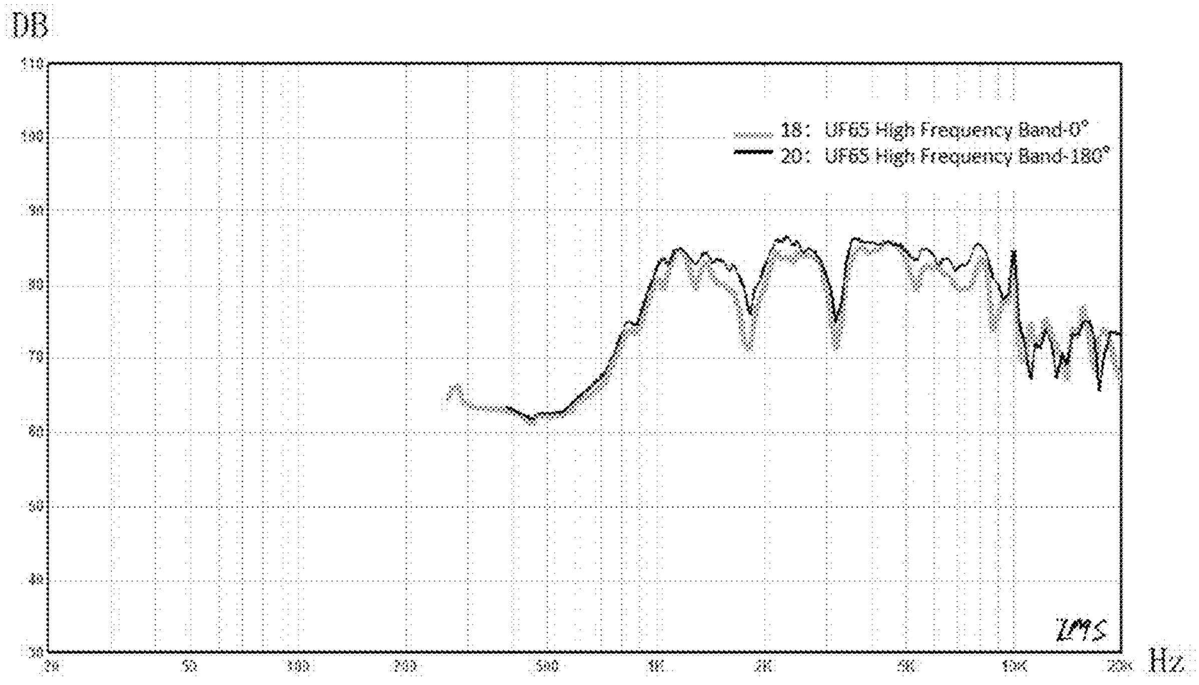
Figure 7:
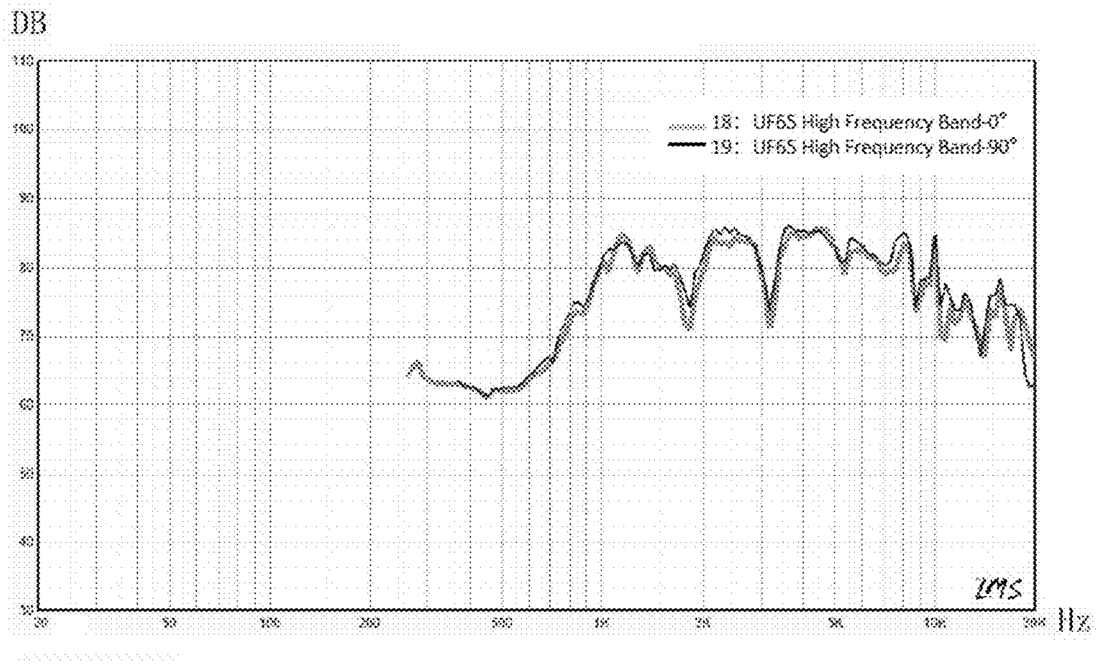

With reference to FIG. 4, FIG. 4 is a top view of the audio equipment 100, the angles in various directions are shown in the top view. Refers to FIG. 5, FIG. 6 and FIG. 7, among them, FIG. 5 is a result graph of high frequency band test at 360°. FIG. 6 is a result graph of high frequency band test at 180°. FIG. 7 is a result graph of high frequency band test at 90°. From the FIG. 5, FIG. 6 and FIG. 7, it can be seen that the high frequency energy around the audio equipment 100 is basically the same.

Figure 8:
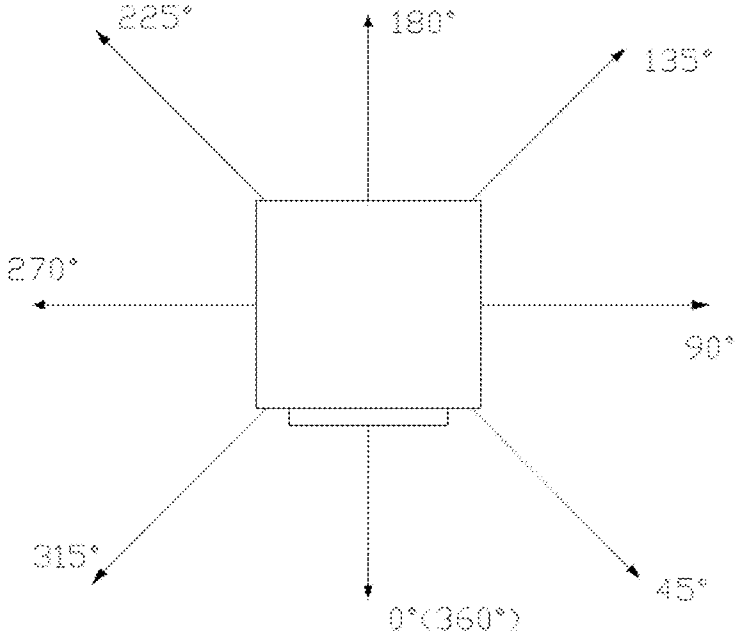
FIG. 8 is a top view of an available audio equipment.
Figure 9:
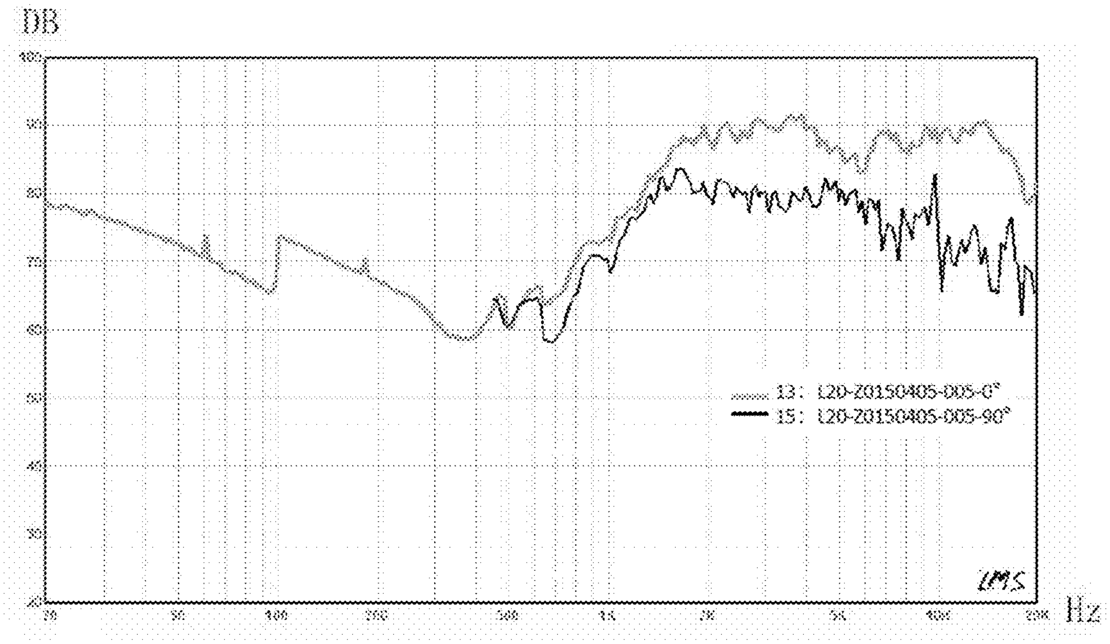
FIGS. 9 to 11 are result graphs of high frequency band test of different angles of an available audio equipment.
Figure 10:
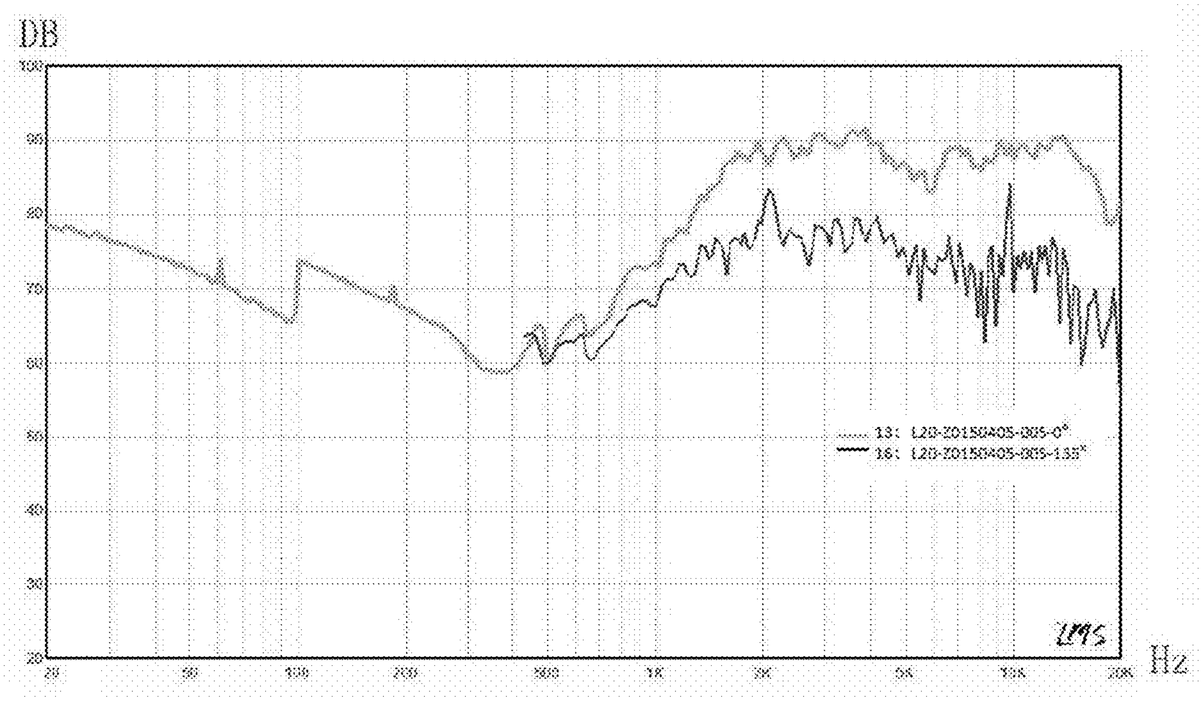
Figure 11:
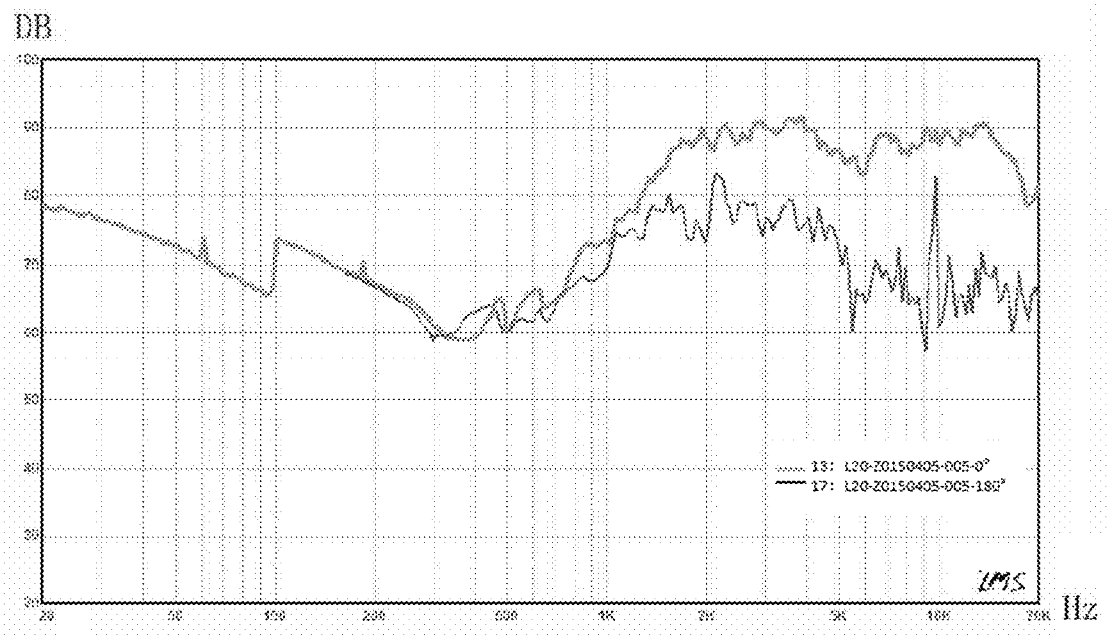

With reference to FIG. 8, FIG. 8 is a top view of an available audio equipment, the angles in various directions are shown in the top view. Refers to FIG. 9, FIG. 10, and FIG. 11, FIGS. 9 to 11 are result graphs of high frequency band test of different angles of an available audio equipment, it can be seen that the sound effect of the available audio equipment is different.

With reference to FIG. 2 and FIG. 3, in some embodiments, the sound signals amplification structure 20 comprises an arc-shaped body 22 and a cone-shaped body 21, the arc-shaped body 22 connects with the connection structure 30. The cone-shaped body 21 faces the sound emit device 10 directly, the cone-shaped body 21 connects with the arc-shaped body 22 on the side of near the sound emit device 10, the arc-shaped body 22 and the cone-shaped body 21 are arranged around a same axis, in a direction of away from the sound emit device 10, cross sectional areas of the arc-shaped body 22 and the cone-shaped body 21 are increased gradually, outer surfaces of the cone-shaped body 21 and the arc-shaped body 22 formed the sound signals amplification surface S.

As the cross sectional areas of the cone-shaped body 21 is increased gradually, the lower end of the cone-shaped body 21 is conical, leading the sound signals spread evenly along the surrounding area, the setting of the arc-shaped body 22 will make the transition of the sound signals smoother.

In some embodiments, the cone-shaped body 21 comprises a first cone part 211, a second cone part 212 and a third cone part 213. The first cone part 211 faces the sound emit device 10 directly. The second cone part 212 is placed coaxially with the first cone part 211, and connects with the first cone part 211 on a side of away from the sound emit device 10. The third cone part 213 is placed coaxially with the first cone part 211, and connects with the second cone part 212 on a side of away from the sound emit device 10, inclinations of the first cone part 211, the second cone part 212 and the third cone part 213 are gradually decreased. Outer surfaces of the first cone part 211, the second cone part 212 and the third cone part 213 formed the sound signals amplification surface S. The shape of first cone part 211 is cone, the shape of the second cone part 212 and the third cone part 213 is frustum. Furthermore, the first cone part 211, the second cone part 212 and the third cone part 213 are integrated molding.

When the sound signals come from directly below, they will change the transmission direction along the first cone part 211, the second cone part 212 and the third cone part 213, and spread evenly all around. By setting gradually decreasing inclinations of the first cone part 211, the second cone part 212 and the third cone part 213, to improve the transmission effect of sound signals.

The arc-shaped body 22, connects with the third cone part 213, can further guide the transmission of sound signals, on the projection plane of the axis O, a junction of the arc-shaped body 22 and the third cone part 213 is curved, making the connection of the arc-shaped body 22 and the third cone part 213 smoother.

Figure 12:
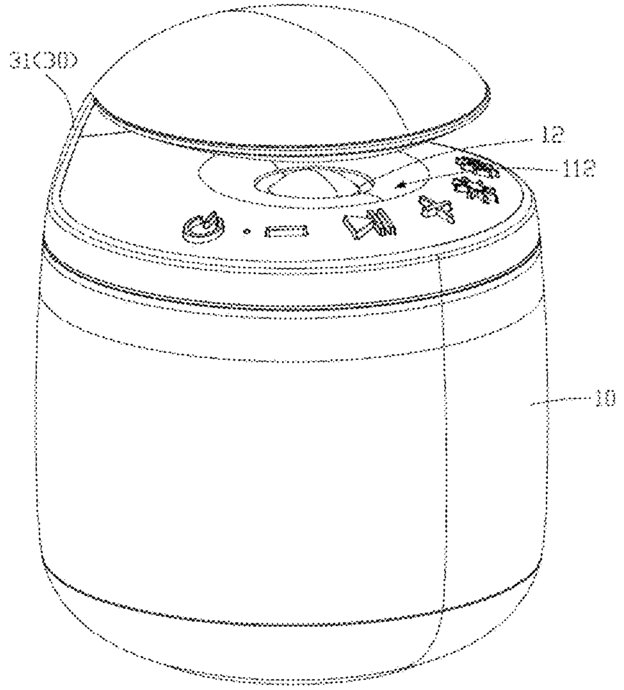
FIG. 12 is a three-dimensional structural schematic diagram of another embodiment of the audio equipment of the present disclosure.
Figure 13:
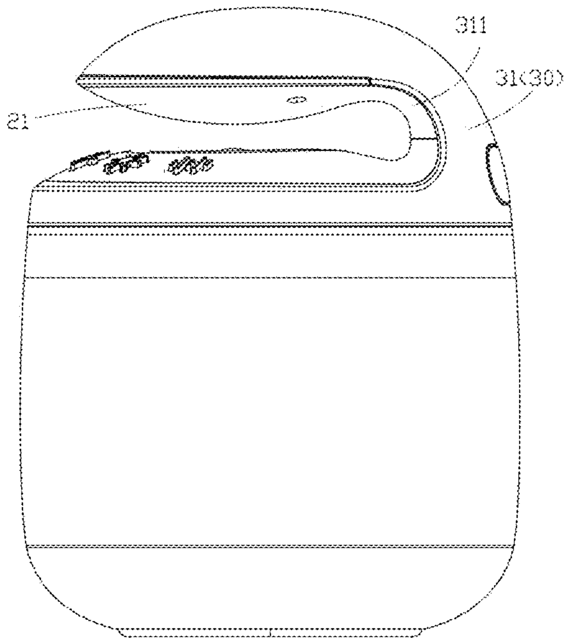
FIG. 13 is a side view of the audio equipment shown in FIG. 12.

With reference to FIG. 12 and FIG. 13, it should be note that, the shape of the sound signals amplification surface S is not limited to structures of cones or frustum. In some embodiments, the sound signals amplification surface S is aspherical, to improve the smoothness of the sound signals amplification surface S, thus improving the transmission effect of the sound signals. Aspheric surface does not include spherical sphere and plane, elliptical surface is aspherical.

It should be note that, in some other embodiments, the sound signals amplification surface S can be some other type, for the shape of the sound signals amplification structure 20 is cone, the sound signals amplification surface S is cone shaped surface.

With reference to FIG. 2 and FIG. 3, in some embodiments, the sound signals amplification structure 20 includes supporting arms 23, an end of the supporting arm 23 connects with the sound signals amplification structure 20, another end of the supporting arm 23 connects with the sound emit device 10, thus can increase the stability of the sound signals amplification structure 20.

After the sound signals emit from the sound emit device 10 transmitted by the sound signals amplification surface S, the high frequency energy around the audio equipment 100 become the same.

With reference to FIG. 2 and FIG. 3, the sound emit device 10 comprises a shell 11 and first sound emit units 12, the shell 11 connects with the connection structure 30 and the supporting arms 23, the first sound emit units 12 connect with the shell 11, the first sound emit units 12 face the sound signals amplification structure 20 directly.

In some embodiments, an arc-shaped part 111 set at an end of the shell 11 which is near the sound signals amplification structure 20, the first sound emit units 12 connect with the arc-shaped part 111, and locate on a center of the arc-shaped part 111, setting the arc-shaped part 111, can expand the sound amplification angle in the vertical direction, equalizing the high frequency band.

Figure 14:
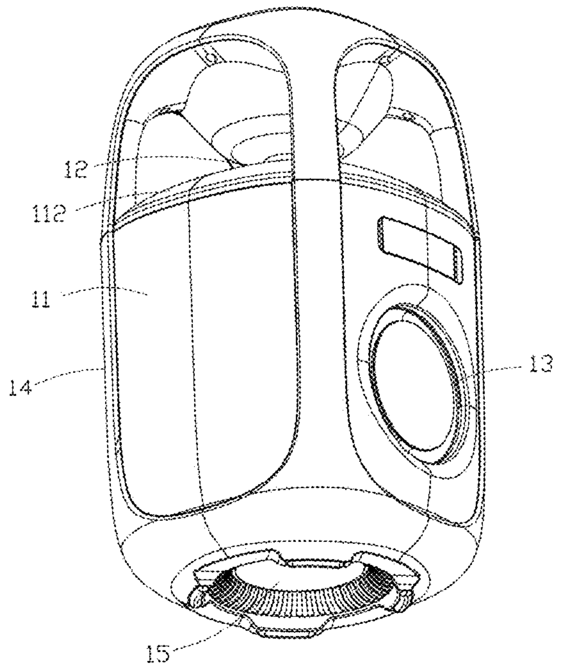
FIG. 14 is a three-dimensional structural schematic diagram of another angle of the audio equipment shown in FIG. 12.

With reference to FIG. 2, FIG. 3 and FIG. 14, in some embodiments, a concave area 112 is formed on a center of the arc-shaped part 111, the concave area 112 sinks away from the sound signals amplification structure 20, the first sound emit units 12 locates on the concave area 112, the first sound emit units 12 and the concave area 112 are coaxial setting. Furthermore, the shape of the concave area 112 is curve, by setting the concave area 112 can let the sound signals transmit to the sound signals amplification structure 20 after reflex by the concave area 112, and enhance the sound signals toward the sound signals amplification structure 20.

In some embodiments, upper ends of the first sound emit units are higher than an end of the arc-shaped part 111, to make a distance between the first sound emit units 12 and the sound signals amplification structure 20 smaller than a distance between the arc-shaped part 111 and the sound signals amplification structure 20. The distance H between the sound signals amplification surface S and the sound emit device 10 is a distance between a top end of the first sound emit units 12 and a top end pf the first cone part 211, thus expanding the sound amplification angle in the vertical direction.

In some embodiments, the amount of the first sound emit unit 12 is one, and is placed coaxially with the sound signals amplification structure 20, making the sound signals amplification structure 20 transmit the sound signals more stable.

Figure 15:
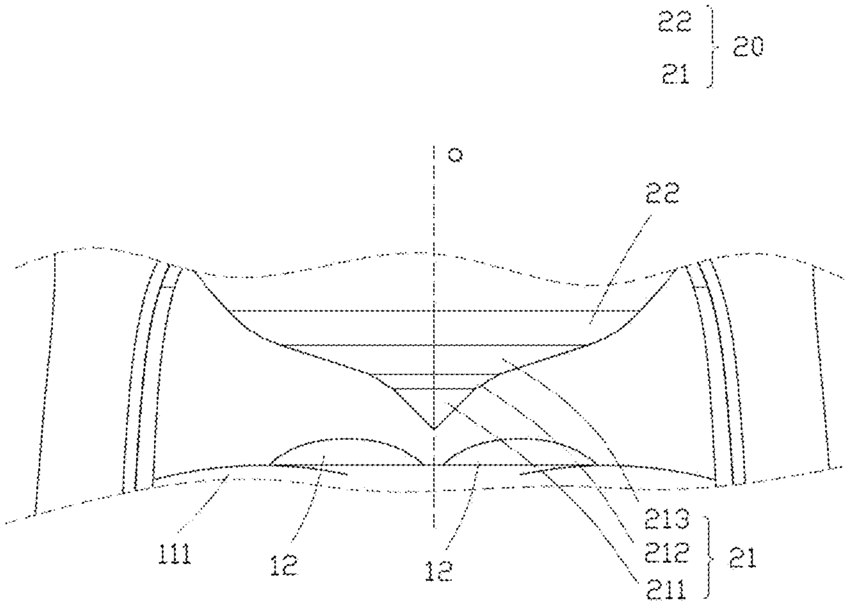
FIG. 15 is a side view of another embodiment of a part of the audio equipment of the present disclosure.

With reference to FIG. 15, in some other embodiments, an amount of the first sound emit units 12 is multiple, multiple of the first sound emit units 12 are set around the axis O, the sound signals amplification structure 20 transmits sound signals emit from the multiple first sound emit units 12. By setting multiple first sound emit units 12, improve the strength of the sound signals. Optionally, the amount of the first sound emit units 12 is 4.

With reference to FIG. 14, the sound emit device 10 comprises a second sound emit unit 13, a third sound emit unit 14 and a forth sound emit unit 15. The second sound emit unit 13 connects with the shell 11, an orientation of the second sound emit unit 13 is perpendicular to a orientation of the first sound emit units 12. The third sound emit unit 14 connects with the shell 11, the third sound emit unit 14 and the second sound emit unit 13 are set back to back, the third sound emit unit 14 and the second sound emit unit 13 locate on the opposite sides of the shell 11. The forth sound emit unit 15 connects with the shell 11. The forth sound emit unit 15 and the first sound emit units 12 are set back to back, the forth sound emit unit 15 and the first sound emit units 12 locate on the opposite sides of the shell 11.

That is, the first sound emit units 12 locates on a top end of the shell 11, the third sound emit unit 14 locates on a end of the shell 11, the third sound emit unit 14 and the second sound emit unit 13 locate on the opposite sides of the shell 11. By setting the first sound emit units 12, the second sound emit unit 13 and the third sound emit unit 14 on the different position of the shell 11, can enlarge the emit effects of the sound signals of the audio equipment 100.

In some embodiments, the first sound emit units 12 are tweeters, the second sound emit unit 13 and the third sound emit unit 14 are medium and low frequency speaker, the forth sound emit unit 15 is a woofer. As the directivity of the sound signals mainly appear at high frequency band, for the first sound emit units 12 act as tweeters, after the sound signals transmit by the sound signals amplification structure 20, can make the directivity of the sound signals surround the audio equipment 100 become inconspicuous, and improving the user's listening experience. The second sound emit unit 13, the third sound emit unit 14 and the forth sound emit unit 15 locate on different position with different orientations, to facilitate the uniform transmission of sound signals from different directions.

In some embodiments, the sound emit device 10 also include a battery, the battery locates inside of the shell 11, the battery connects with the first sound emit units 12, the second sound emit unit 13 and the third sound emit unit 14, used for providing power for the first sound emit units 12, the second sound emit unit 13 and the third sound emit unit 14.

The shape of the shell is not limited, in some embodiments, the shape is cylindrical (shown as FIG. 12 and FIG. 13). In some other embodiments, the shape of the shell is triangular prism or spherical.

The sound emit device 10 connects with the sound signals amplification structure 20 with the help of the connection structure 30, to keep the relative position of the sound emit device 10 and the sound signals amplification structure 20 stable.

With reference to FIG. 2 and FIG. 3, in some embodiments, the connection structure 30 comprises four connecting arms 31, four of the connecting arms 31 are set separately around the axis O of the sound signals amplification structure 20, each of the connecting arms 31 connect with the sound signals amplification structure 20 and the sound emit device 10, four of the connecting arms 31 locate on the outside of the sound emit device. By setting four connecting arms 31 to keep the relative position of the sound signals amplification structure 20 and the sound emit device 10 stable, four of the connecting arms 31 are set around the axis, to reduce the impact of the connecting arms 31 block the sound signals. Optionally, the amount of the supporting arms 23 is four, the position of each pair of connecting arms 31 and supporting arms 23 are correspond to each other, and the structures are matching each other, to reduce the impact of the supporting arms 23 block the sound signals. It should be understood that the amount of the connecting arms 31 is not limited to four, in some other embodiments it can be 3.

Figure 16:
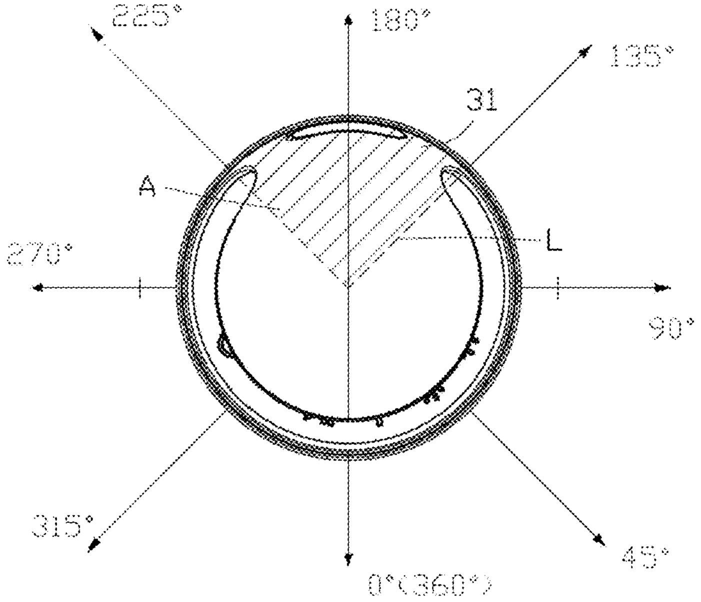
FIG. 16 is a top view of the audio equipment shown in FIG. 12.

With reference to FIG. 12, FIG. 13 and FIG. 16, in some other embodiments, the connection structure 30 comprises only one connecting arm 31, connecting arms 31 connect with the sound signals amplification structure 20 and the sound emit device 10, the connecting arm 31 has an obstruction surface 311, an obstruction space A forms by links L between two sides of the obstruction surface 311 and the axis O of the sound signals amplification structure 20, a central angle of the obstruction space A is 90°.

Set only one connecting arm 31, reduce the number of the connecting arm 31, to further reduce the impact of the connecting arms 31 block the sound signals. The central angle of the obstruction space A is 90°, to enlarge the volume of the connecting arms 31, thus improving the connection stability of the sound signals amplification structure 20 and sound emit device.

Figure 17:
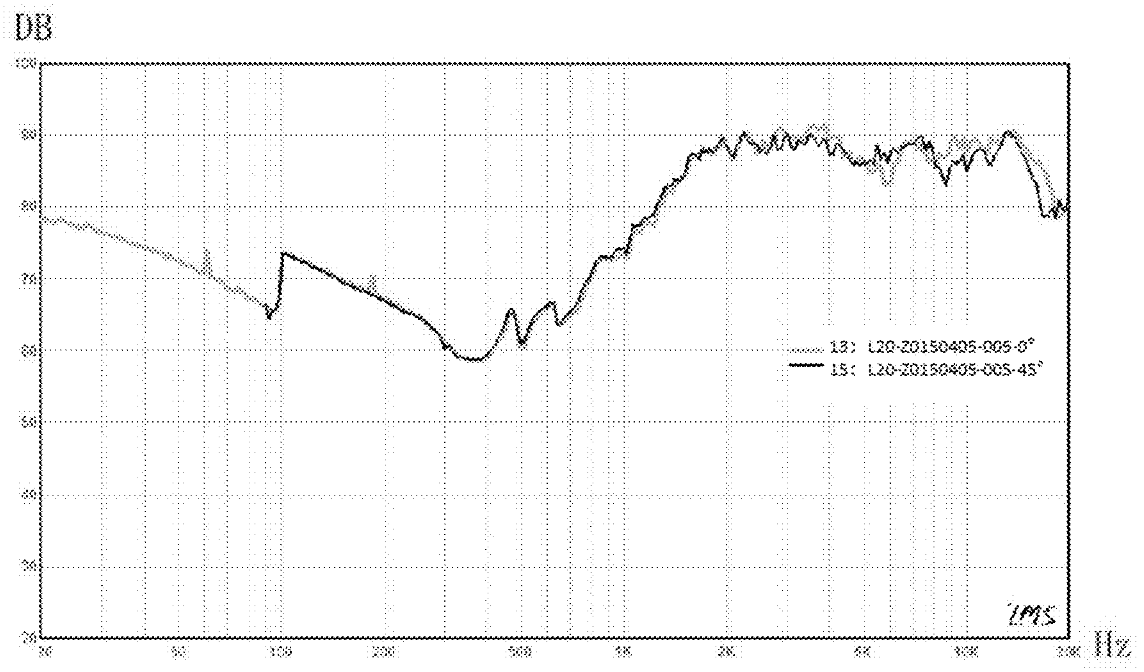
FIGS. 17 to 19 are result graphs of high frequency band test of different angles of another embodiment of the audio equipment of the present disclosure.
Figure 18:
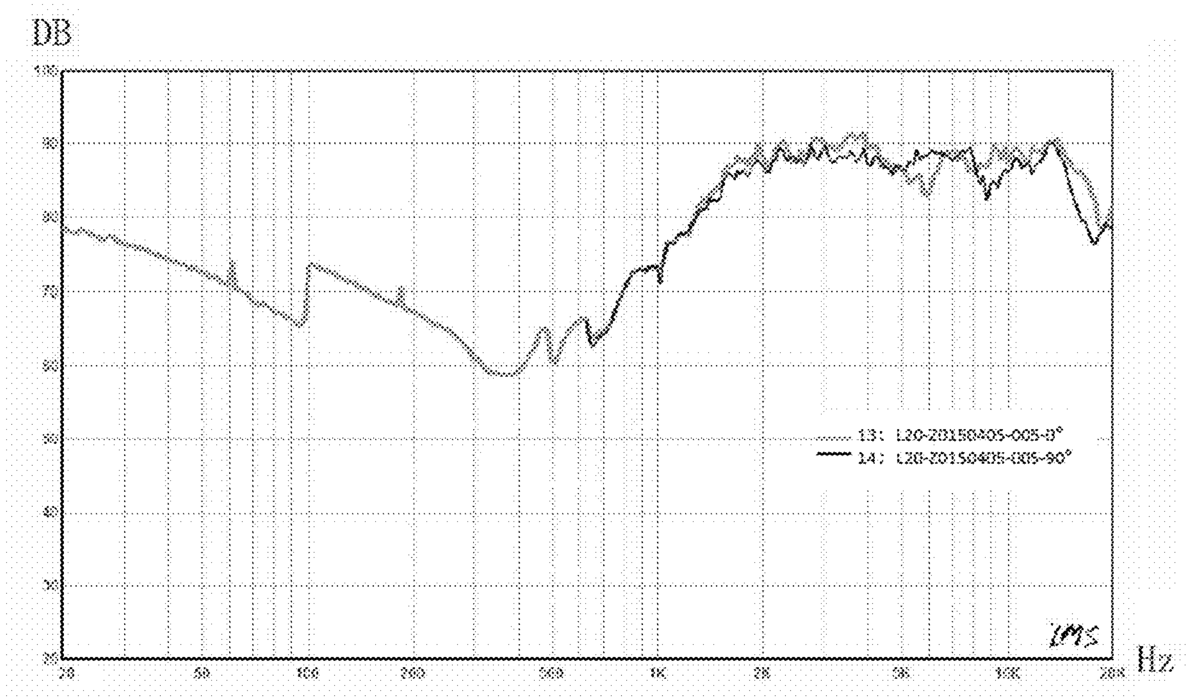
Figure 19:
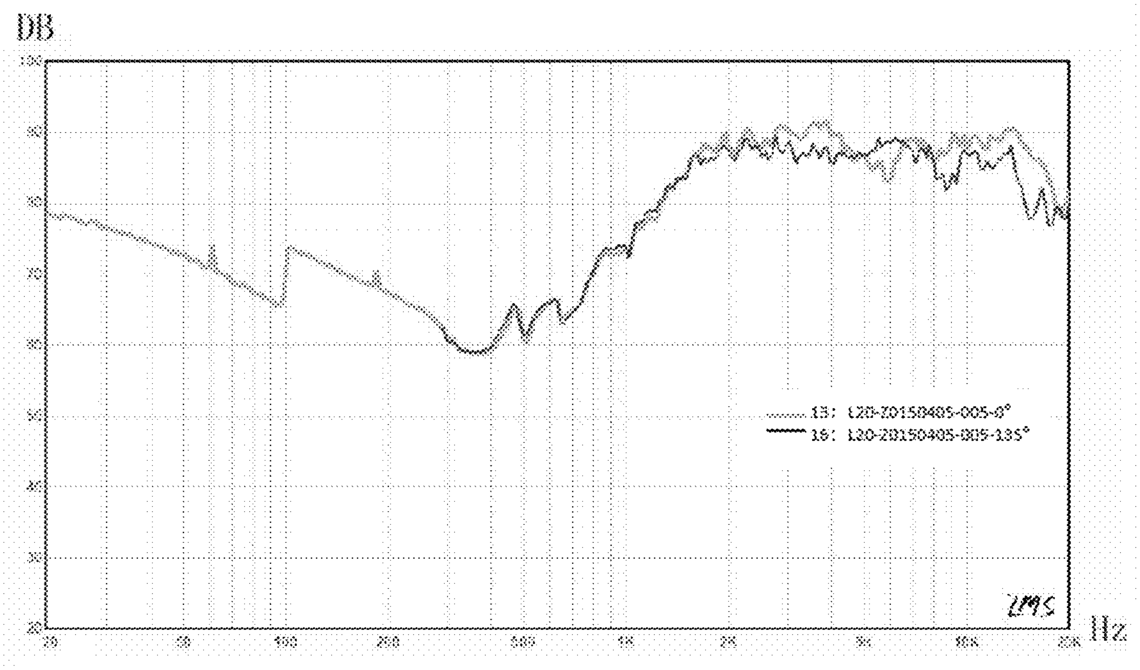

With reference to FIG. 17 to FIG. 19, FIGS. 17 to 19 are result graphs of high frequency band test of different angles of the audio equipment 100 with only one connecting arm 31, the figures show that the effect of the high frequency band at different positions are basically the same.

By setting one connecting arm 31, the sound signals emit from the first sound emit units 12 can transmit at a range of 270° on horizontal direction. When the audio equipment 100 works, users usually besides the audio equipment 100 at a half side, and another half side usually stand a wall or has nobody, thus it won't influence the users' listening experience by setting one connecting arm 31. What's more, the connecting arm 31 reflect the sound signals emit from the first sound emit units 12, to enhance the sound signals that transmit to users, which is beneficial for improving user experience.

With reference to FIG. 2 to FIG. 3, in some embodiments, the connection structure 30 also comprises a base 32 and a top 33, the sound emit device 10 is set on the base 32. The top 33 and the base 32 are set relative to each other, the sound signals amplification structure 20 connects with the top 33, ends of the connecting arms (31) are connect with the base 32, other ends of the connecting arms 31 are connect with the top 33. The base 32 and the top 33 can protect the sound emit device 10 and the sound signals amplification structure 20, and can enhance the stability of the connecting arm 31. Optionally, the upper end of the connecting arms 31 and the top 33 are integrated molding, the lower end of the connecting arms 31 and the base 32 are integrated molding.

In some embodiments, the an upper end of the top 33 forms a grip 331, the set of the grip 331 can facilitate users carry and move the audio equipment 100.

In some embodiments, an accommodation space 34 is formed between the top 33, the base 32 and two adjacent connecting arms 31. By setting the accommodation space 34, making the sound signals transmit from the sound signals amplification structure 20, and pass the accommodation space 34 then spread out.

With reference to FIG. 1, understandably, the connection structure 30 is not limit to the connecting arms 31, through the connection structure 30 to connect the sound signals amplification structure 20 and the sound emit device 10. In some other embodiments, the shape of the connection structure 30 is cylinder, the axis of the connection structure 30 is overlap with the axis of the sound signals amplification structure 20, the sound signals amplification surface S locates inside the connection structure 30. The upper end of the connection structure 30 connects the arc-shaped body 22 of the sound signals amplification structure 20, the lower end of the connection structure 30 connects the sound emit device 10.

Setting the connection structure 30 as cylinder, strengthening the stability of the sound signals amplification structure 20 and the sound emit device 10, and making the transmission of the sound signals more even.

Above all, the audio equipment 100 of the present disclosure, the sound signals amplification structure 20 makes the sound signals spread evenly, thus the high frequency energy around the audio equipment is basically the same, improving the user's listening experience. By setting the connection structure 30 to keep the relative position of the sound emit device 10 and the sound signals amplification structure 20 stable.

The foregoing descriptions are merely embodiments of the present disclosure, and are not intended to limit the scope of the present disclosure. An equivalent structural or equivalent process alternation made by using the content of the specification and drawings of the present disclosure, or an application of the content of the specification and drawings directly or indirectly to another related technical field, shall fall within the protection scope of the present disclosure.

What is claimed is:

1. An audio equipment, comprises a sound emit device (10), the sound emit device (10) is used to emit sound signals, wherein the audio equipment also comprises:

a sound signals amplification structure (20), the sound signals amplification structure (20) has an axis (O) and a sound signals amplification surface(S), the sound signals amplification surface(S) is formed by rotating the axis (O), the sound signals amplification surface(S) faces the sound emit device (10) directly, with a distance (H) between the sound signals amplification surface(S) and the sound emit device (10), wherein in a direction of away from the sound emit device (10), a cross sectional area of the sound signals amplification structure (20) increases gradually;

a connection structure (30), the connection structure (30) connects the sound emit device (10) and the sound signals amplification structure (20);

the sound emit device (10) comprises:

a shell (11), the shell (11) connects with the connection structure (30), an end of the shell (11) which is near the sound signals amplification structure (20) formed an arc-shaped part (111);

first sound emit units (12), the first sound emit units (12) connect with the arc-shaped part (111), and locate on a center of the arc-shaped part (111), the first sound emit units (12) face the sound signals amplification surface(S) directly a second sound emit unit (13), the second sound emit unit (13) connects with with the shell (11), an orientation of the second sound emit unit (13) is perpendicular to a orientation of the first sound emit units (12);

a third sound emit unit (14), the third sound emit unit (14) connects with the shell (11), the third sound emit unit (14) and the second sound emit unit (13) are set back to back, the third sound emit unit (14) and the second sound emit unit (13) locate on the opposite sides of the shell (11); and a forth sound emit unit (15), the forth sound emit unit (15) connects with the shell (11), the forth sound emit unit (15) and the first sound emit units (12) are set back to back, the forth sound emit unit (15) and the first sound emit units (12) locate on the opposite sides of the shell (11).

2. The audio equipment of claim 1, wherein the sound signals amplification structure (20) comprises:

an arc-shaped body (22), the arc-shaped body (22) connects with the connection structure (30);

a cone-shaped body (21), the cone-shaped body (21) faces the sound emit device (10) directly, the cone-shaped body (21) connects with the arc-shaped body (22) on the side of near the sound emit device (10), the arc-shaped body (22) and the cone-shaped body (21) are arranged around a same axis, in a direction of away from the sound emit device (10), cross sectional areas of the arc-shaped body (22) and the cone-shaped body (21) are increased gradually, outer surfaces of the cone-shaped body (21) and the arc-shaped body (22) formed the sound signals amplification surface(S).

3. The audio equipment of claim 2, wherein the cone-shaped body (21) comprises:

a first cone part (211), the first cone part (211) faces the sound emit device (10) directly;

a second cone part (212), the second cone part (212) is placed coaxially with the first cone part (211), and connects with the first cone part (211) on a side of away from the sound emit device (10);

a third cone part (213), the third cone part (213) is placed coaxially with the first cone part (211), and connects with the second cone part (212) on a side of away from the sound emit device (10), inclinations of the first cone part (211), the second cone part (212) and the third cone part (213) are gradually decreased.

4. The audio equipment of claim 2, wherein a range of the distance (H) between the sound signals amplification surface (S) and the sound emit device (10) is 6 mm-25 mm.

5. The audio equipment of claim 1, wherein the sound signals amplification surface(S) is aspherical.

6. The audio equipment of claim 1, wherein an amount of the first sound emit units (12) is multiple, multiple of the first sound emit units (12) are set around the axis (O).

7. The audio equipment of claim 1, wherein the first sound emit units (12) are tweeters, the second sound emit unit (13) and the third sound emit unit (14) are medium and low frequency speaker, the forth sound emit unit (15) is a woofer.

8. The audio equipment of claim 1, wherein the connection structure (30) comprises four connecting arms (31), four of the connecting arms (31) are set separately around the axis (O) of the sound signals amplification structure (20), each of the connecting arms (31) connect with the sound signals amplification structure (20) and the sound emit device (10), four of the connecting arms (31) locate on the outside of the sound emit device (10).

9. The audio equipment of claim 8, wherein the connection structure (30) also comprises:

a base (32), the sound emit device (10) is set on the base (32);

a top (33), the top (33) and the base (32) are set relative to each other, the sound signals amplification structure (20) connects with the top (33), ends of the connecting arms (31) are connect with the base (32), other ends of the connecting arms (31) are connect with the top (33).

10. The audio equipment of claim 9, wherein an upper end of the top (33) forms a grip (331).

11. The audio equipment of claim 9, wherein an accommodation space (34) is formed between the top (33), the base (32) and two adjacent connecting arms (31).

12. An audio equipment, comprises a sound emit device (10), the sound emit device (10) is used to emit sound signals, wherein the audio equipment also comprises:

a sound signals amplification structure (20), the sound signals amplification structure (20) has an axis (O) and a sound signals amplification surface(S), the sound signals amplification surface(S) is formed by rotating the axis (O), the sound signals amplification surface(S) faces the sound emit device (10) directly, with a distance (H) between the sound signals amplification surface(S) and the sound emit device (10), wherein in a direction of away from the sound emit device (10), a cross sectional area of the sound signals amplification structure (20) increases gradually; and a connection structure (30), the connection structure (30) connects the sound emit device (10) and the sound signals amplification structure (20), wherein the connection structure (30) comprises a connecting arm (31), the connecting arm (31) connects with the sound signals amplification structure (20) and the sound emit device (10), the connecting arm (31) has an obstruction surface (311), an obstruction space (A) forms by links (L) between two sides of the obstruction surface (311) and the axis (O) of the sound signals amplification structure (20), a central angle of the obstruction space (A) is 90°.

13. The audio equipment of claim 12, wherein the obstruction surface (311) is a curved surface.

14. An audio equipment, comprises a sound emit device (10), the sound emit device (10) is used to emit sound signals, wherein the audio equipment also comprises:

a sound signals amplification structure (20), the sound signals amplification structure (20) has an axis (O) and a sound signals amplification surface(S), the sound signals amplification surface(S) is formed by rotating the axis (O), the sound signals amplification surface(S) faces the sound emit device (10) directly, with a distance (H) between the sound signals amplification surface(S) and the sound emit device (10), wherein in a direction of away from the sound emit device (10), a cross sectional area of the sound signals amplification structure (20) increases gradually; and a connection structure (30), the connection structure (30) connects the sound emit device (10) and the sound signals amplification structure (20);

the sound emit device (10) comprises a shell (11) and first sound emit units (12);

the shell (11) connects with the connection structure (30), an end of the shell (11) which is near the sound signals amplification structure (20) formed an arc-shaped part (111);

the first sound emit units (12) connect with the arc-shaped part (111), and locate on a center of the arc-shaped part (111), the first sound emit units (12) face the sound signals amplification surface(S) directly, a concave area (112) is formed on a center of the arc-shaped part (111), wherein the first sound emit units (12) is configured to:

be located on the concave area (112), the first sound emit units (12) and the concave area (112) are coaxial setting; and/or determine a distance between the first sound emit units (12) and the sound signals amplification structure (20) which is smaller than a distance between the arc-shaped part (111) and the sound signals amplification structure (20).

* * * * *